UNITED STATES PATENT OFFICE.

LAUNCELOT W. ANDREWS, OF CHICAGO, ILLINOIS.

PROCESS FOR MANUFACTURING OXALATES.

1,281,117.      Specification of Letters Patent.      Patented Oct. 8, 1918.

No Drawing.      Application filed May 8, 1915. Serial No. 26,741.

*To all whom it may concern:*

Be it known that I, LAUNCELOT W. ANDREWS, a citizen of the United States, and a resident of Chicago, Cook county, and State of Illinois, have invented certain new and useful Improvements in Processes for Manufacturing Oxalates, of which the following is a specification.

The invention relates to the manufacture of alkali oxalates from alkali formates. As is well known, sodium or other alkali formate, is converted into oxalate by the action of heat, whereby hydrogen gas is liberated and alkali oxalate is produced. It is the present practice to add to sodium (or other alkali) formate used, large amounts of inert substances such as sodium carbonate, sodium oaxlate, charcoal powder, etc., or to add small amounts of free alkali, i. e., sodium hydroxid, NaOH, or of potassium hydroxid, KOH. The object of these additions is to increase the yield of oxalate and to secure better regulation and control of the reaction.

The present invention is based on the discovery of the fact that an admixture of a small amount of a suitable arsenate or arsenite (preferably an alkali arsenate or arsenite) to the formate employed in the process, has a highly beneficial influence, in that it increases the yield of oxalate, renders the reaction less stormy, sudden or turbulent and more easily controlled, and avoids the introduction of large amounts of foreign material which must be subsequently separated from the product at considerable expense. The recovery of the small amount of arsenate or arsenite required under the new process can be readily and inexpensively accomplished.

Preferably di- or tri-alkali arsenate is employed, and in accordance with the preferred process, trisodium arsenate, $Na_3AsO_4$, or trisodium arsenite, $Na_3AsO_3$, is used. The amount of alkali arsenate or arsenite required does not exceed two or three per cent. of the weight of the formate employed. For example, the improved process can be carried out as follows:—

Example: 500 pounds of sodium formate is intimately mixed with 12 pounds of trisodium arsenate, $Na_3AsO_4$, which may contain water of crystallization or may be dry. The mixture is then heated to a suitable temperature, say 380° C., until the reaction is complete. The action proceeds steadily and rapidly until near the end, when it becomes somewhat slower.

While trisodium and tripotassium arsenate or arsenite are preferred, and can be readily recovered in the alkali arsenate produced, the use of other suitable, soluble arsenates or arsenites is contemplated and is comprised within the scope of the invention. The tribasic arsenates or arsenite of the common alkali metal sodium and potassium can be readily recovered by treating the product of the reaction with a relatively small amount of water. In this way the arsenate or arsenite used is dissolved leaving the greater part of the difficultly soluble sodium oxalate undissolved. After filtration the filtrate is evaporated to dryness and the dry residue obtained can be used again as catalyzer for a subsequent operation.

The term "arsenate" and "arsenite" as used in this specification and the claims, unless otherwise qualified, is to be understood as designating a chemical compound containing the radicals characteristic of arsenic acid, $H_3(AsO_4)$, or of arsenous acid, $H_3(AsO_3)$, and it is recognized that the properties which make these compounds suitable for the purpose of the hereindescribed invention are mainly due to these acid or negative groups and only subordinately to the other elements present in said compounds. Certain arsenates or arsenites, however, cannot be used to advantage in the improved process. These are the salts of bases which interfere with or act as anticatalyzers of the desired reaction, as for example, nickel arsenate or arsenite.

It is obvious that changes may be made in the details set forth without departure from the essentials of the invention as defined in the claims.

I claim as my invention:—

1. The process of manufacturing oxalates which consists in heating a mixture of formates and catalytic salts containing the acid radicals characteristic of the acids of arsenic.

2. The process of manufacturing alkali oxalate, which consists in heating alkali metal formate admixed with a catalytic salt of an acid of arsenic.

3. The process of manufacturing alkali oxalate, which consists in heating alkali metal formate admixed with an alkali metal salt of an acid of arsenic.

4. The process of manufacturing sodium oxalate which consists in heating sodium formate admixed with tri-alkali salt of an oxy-acid of arsenic.

5. The process of manufacturing alkali formate which consists in heating alkali formate admixed with a relatively small amount of trisodium salt of an oxy-acid of arsenic.

LAUNCELOT W. ANDREWS.